United States Patent

Hikari

[11] Patent Number: 5,944,150
[45] Date of Patent: Aug. 31, 1999

[54] HOIST GEAR WITH A BRAKE

[75] Inventor: Kazuo Hikari, Suita, Japan

[73] Assignee: Sanyo Kogyo Co., Ltd., Suita, Japan

[21] Appl. No.: 08/819,801

[22] Filed: Mar. 18, 1997

[30] Foreign Application Priority Data

Mar. 22, 1996 [JP] Japan ................................. 8-093153
Oct. 25, 1996 [JP] Japan ................................. 8-301292

[51] Int. Cl.⁶ .............................. B66D 1/04; B66D 1/08; B60L 7/00
[52] U.S. Cl. ...................... 188/161; 188/156; 188/72.3; 254/375; 254/378
[58] Field of Search ............................. 188/58, 59, 71.1, 188/72.3, 73.1, 156, 161, 163, 184, 187; 254/274, 310, 356, 375, 378

[56] References Cited

U.S. PATENT DOCUMENTS

| | | | |
|---|---|---|---|
| 3,722,636 | 3/1973 | Kobelt | 188/170 |
| 4,177,973 | 12/1979 | Miller et al. | 254/276 |
| 4,192,485 | 3/1980 | Rassier et al. | 254/187.5 |
| 4,328,954 | 5/1982 | Logus | 254/344 |
| 4,513,952 | 4/1985 | Vandelinde | 254/285 |
| 4,754,633 | 7/1988 | Glover | 72/289 |
| 4,923,055 | 5/1990 | Holland | 187/109 |
| 5,048,172 | 9/1991 | Gravenhorst | 254/379 |
| 5,101,939 | 4/1992 | Sheridan | 188/171 |
| 5,253,738 | 10/1993 | Vertesy et al. | 188/72.3 |
| 5,582,277 | 12/1996 | Heidenreich et al. | 188/171 |

FOREIGN PATENT DOCUMENTS 8-240231   9/1996   Japan .

Primary Examiner—Chris Schwartz
Attorney, Agent, or Firm—Armstrong, Westerman, Hattori, McLeland, Naughton

[57] ABSTRACT

A brake for a hoist gear is provided with a pair of brake shoes for braking a disk to be braked arranged on a winding drum side by pressing both sides of the disk. Floating pin fitting piece portions protrude integrally from a body of a bearing supporting the winding drum. A caliper is attached to the fitting piece portions through floating pins. Axis points of the floating pins are arranged in point symmetry of approximately 180° in respect of an axis point of a push rod inserted into the caliper in order to uniformly contact the disk face.

3 Claims, 18 Drawing Sheets

HOIST GEAR WITH A BRAKE

BACKGROUND OF THE INVENTION

1. Field of the Invention

This invention relates to a brake for a hoist gear.

2. Description of the Related Art

A conventional brake used for a hoist gear (for example, a winch) includes a winding drum for winding a wire and a bearing supporting the winding drum as a unit and a brake arranged separately from the unit.

A combination of the hoist gear main body and the brake has a complicated structure, and it is relatively difficult to diminish the space required for the brake. Owing to conditions under which a hoist gear (for example, a winch) is used, a disk and a brake shoe of the brake are not adjusted to fit each other by actually using the brake for a hoist gear, therefore it is difficult to arrange the brake shoe to uniformly contact a face of the disk in some cases.

It is therefore an object of the present invention to provide a brake for a hoist gear wherein the foregoing problems are solved and the brake shoe is adjusted to uniformly contact the disk face.

BRIEF DESCRIPTION OF THE DRAWINGS

The present invention will be described with reference to the accompanying drawings, in which.

DESCRIPTION OF THE PREFERRED EMBODIMENTS

Preferred embodiments of the present invention will now be described with reference to the accompanying drawings.

Figure 1:
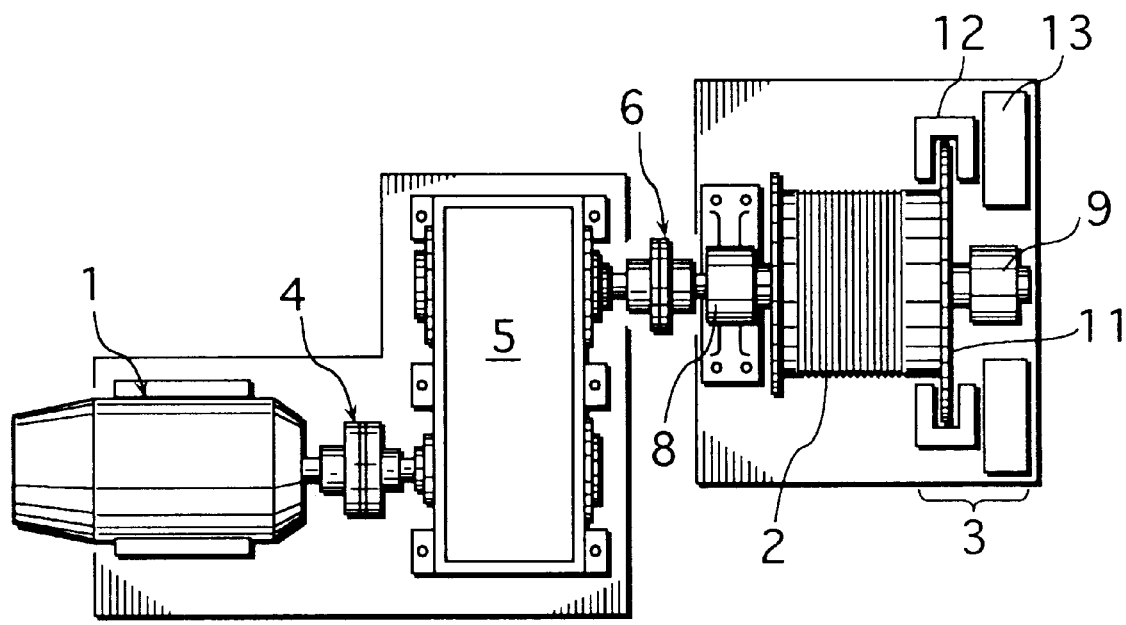
FIG. 1 is a top plan view of a whole of a first brake for a hoist gear according to the present invention.

FIG. 1 is a top plan view showing an outline of a brake for a hoist gear (for example, a winch or an elevator) as a whole. 1 is a motor, 2 is a winding drum (a winding barrel), and 3 is a brake. Output of the motor 1 rotates the winding drum 2 through a coupling 4, a reduction gear 5, and a coupling 6.

Figure 2:
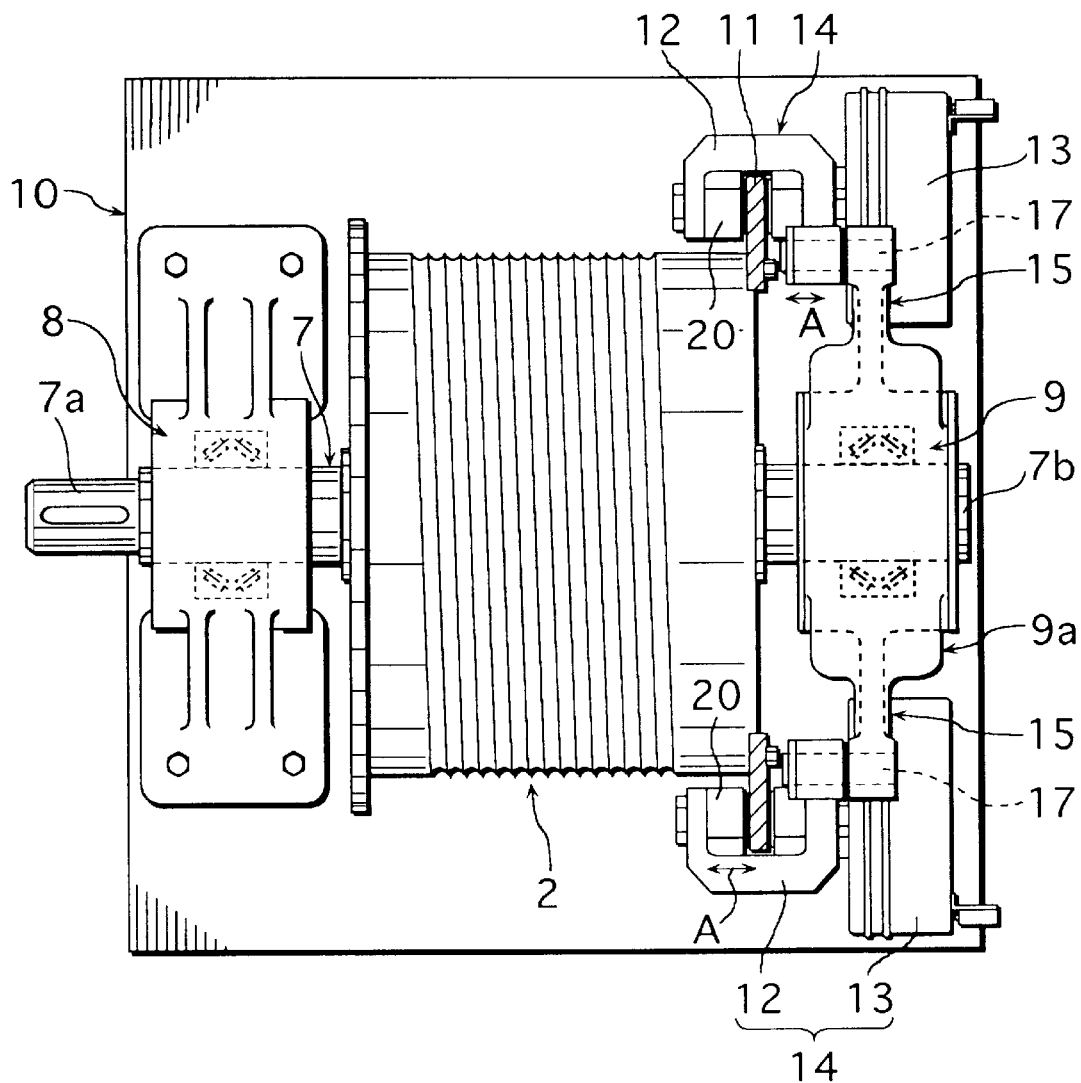
FIG. 2 is an enlarged view of a principal portion of the brake for a hoist gear in FIG. 1.

FIG. 2 is an enlarged view of a principal portion of FIG. 1, and a shaft 7 of the winding drum 2 is rotatably supported by a pair of bearings 8, 9, and the winding drum 2 freely rotates. The first bearing 8 supports an input shaft portion 7a where the coupling 6 in FIG. 1 is connected, and the second bearing 9 supports a protruding shaft portion 7b.

Figure 3:
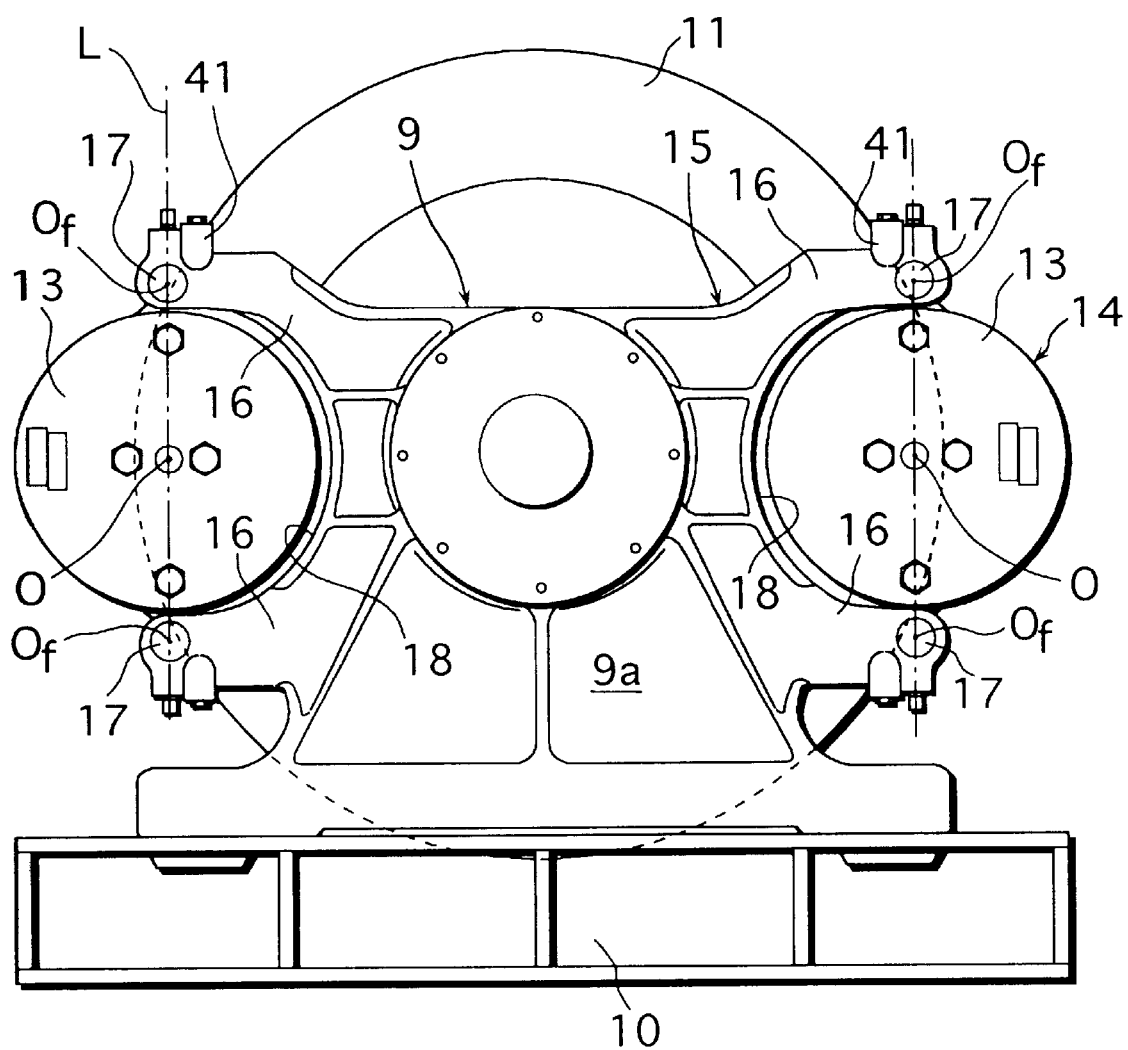
FIG. 3 is a right side view of the brake for a hoist gear.
Figure 10:
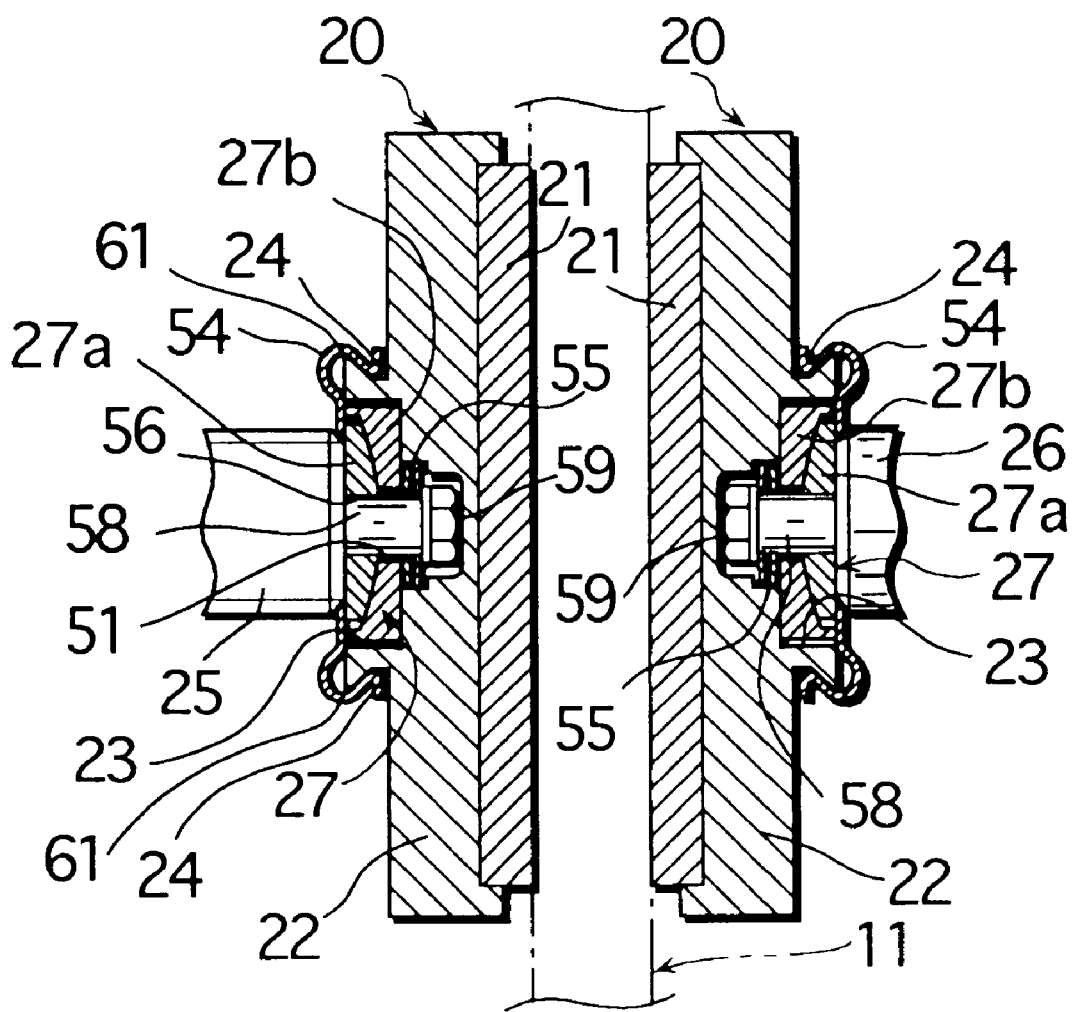
FIG. 10 is an enlarged section of a principal portion.

FIG. 3 is a right side view of FIG. 2. In FIG. 2 and FIG. 3, 10 is a base, and the winding drum 2 is rotatably supported by fixing the bearings 8, 9 with bolts and an elevator rope is wound round the winding drum 2. It is possible to omit the reduction gear 5 in FIG. 1 in some cases.

The following is an explanation of the brake 3. A disk 11 in a configuration of a circular flat plate is fixed at an end (in the illustration, the opposite side of the input shaft portion 7a side) of the winding drum 2. A unit 14 containing a caliper 12 and an electromagnet portion 13 is attached to a fitting member 15 and freely floats for a minute distance. This fitting member 15 comprises a body 9a itself of said bearing 9. In other words, four floating pin fitting piece portions 16 integrally protrude from the body 9a toward left, right, upside, and downside, and the caliper 12 is attached to the fitting piece portions 16 of the body 9a through floating pins 17.

The caliper 12 is thus attached to the body 9a itself of the second bearing 9 through the floating pins 17 and freely floats toward an arrow A in FIG. 2 for a minute distance. It is therefore possible to slightly move the whole unit 14 toward the arrow A.

Figure 6:
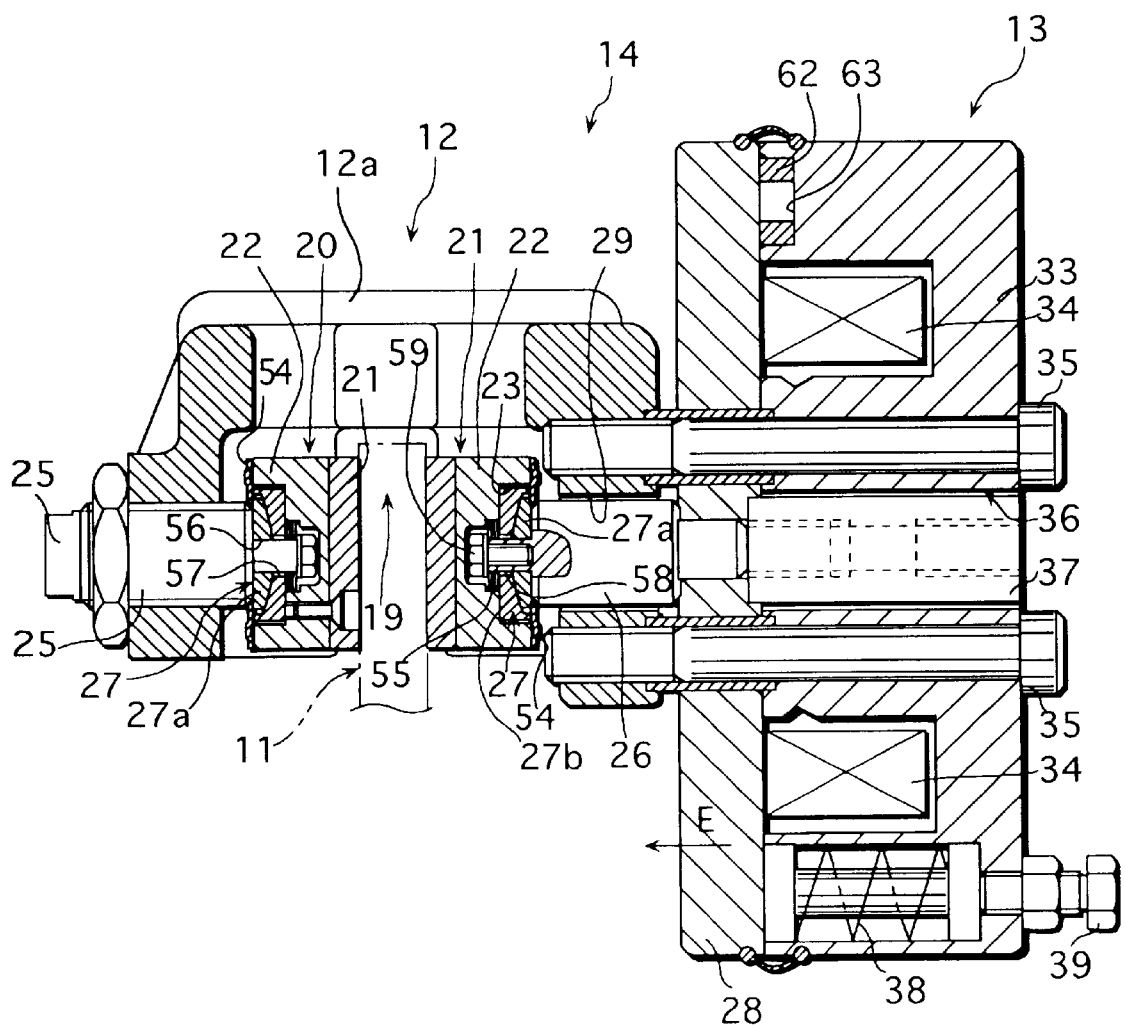
FIG. 6 is an enlarged sectional view of a principal portion.

The electromagnet portion 13 is discoid in the illustration of FIG. 2 and FIG. 3, and a pair of protruding arm-like fitting piece portions 16 protruding toward upside and downside respectively form a concave portion 18 in a configuration of a half circular arc which corresponds to a half circular arc of the discoid electromagnet portion 13 and are arranged to compactly hold the unit 14 (the electromagnet portion 13 and the caliper 12). FIG. 6 obviously shows that an axis of the electromagnet portion 13 coincides with an axis of a push rod 26 (which is described later), and when an axis point 0 of the push rod 26 (the electromagnet portion 13) is viewed from its axis, axis points $0_f$ of the floating pins 17 are arranged in symmetry of approximately 180° as shown in FIG. 3. That is to say, the three axis points $0_f$, 0, $0_f$ are arranged on a straight line L. It is therefore possible to slightly move the unit 14 smoothly along the floating pins 17. That is to say, an axial hole of the unit 14 does not slant against the floating pins 17, therefore the coefficient of friction does not increase and the unit 14 moves smoothly. While two units 14 are illustrated in FIG. 2 and FIG. 3, it is possible to use only one unit, or conversely, three units or more.

In some cases, it is preferable to arrange each fitting piece portion 16 formed on the body 9a to be large in width, be provided with two pins 17, and hold the unit 14 like a cantilever.

Next, FIGS. 5 to 14 show more concrete construction of each portion of the brake 3, which is explained below with reference to these figures.

Figure 5:
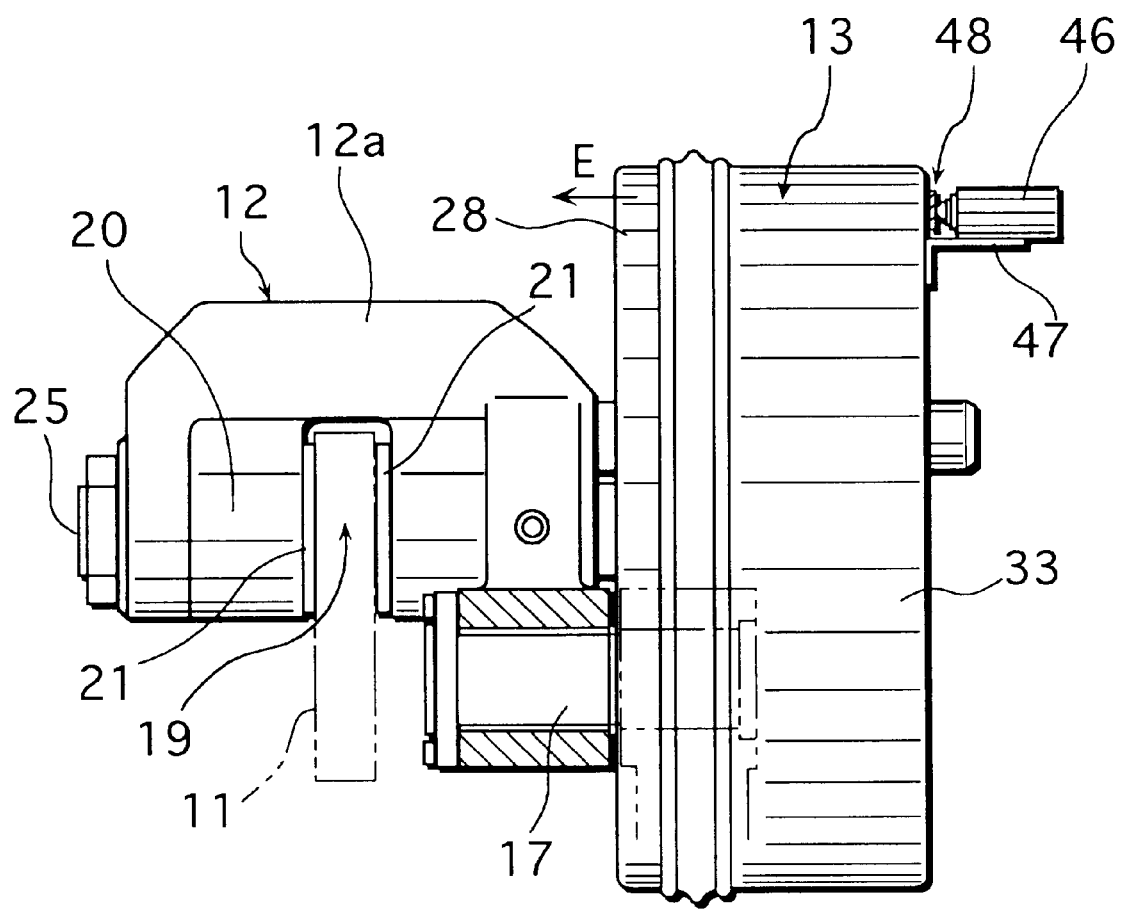
FIG. 5 is an enlarged plan view of a principal portion.

In FIG. 5, FIG. 6, and FIG. 10, the caliper 12 possesses a groove portion 19 where an outer circumferential margin of the disk 11 is inserted. A pair of brake shoes 20 are arranged inside the groove portion 19, and the brake shoes 20 press both sides of the disk 11 to be braked arranged on the winding drum 2 and brake the disk 11.

Each of the brake shoes 20 comprises a brake pad portion 21 for directly contacting the disk 11 and a brake shoe main body portion 22 fixing the brake pad portion 21. The main body portion 22 possesses a hollow 23 on an outer end face thereof, and a stepped portion with parallel hitching grooves 24 are formed on a circumferential wall at an opening side of the hollow 23.

As shown in FIG. 5 and FIG. 6, an adjusting screw 25 with a lock nut is arranged on a side wall of approximately arch-shaped caliper main body 12a, and the push rod 26 of the electromagnet portion 13 is arranged on the other side wall. The brake shoes 20 are arranged on an end of the adjusting screw 25 and an end of the push rod 26 through centripetal couplings 27, spherical couplings, or oscillating couplings, and the brake shoes 20 are freely oscillated.

The brake shoes 20 are arranged to freely oscillate and uniformly contact the both sides of the disk 11 respectively in a centripetal structure.

The adjusting screw 25 is fitted in a tapped hole of the caliper main body 12a and freely screws back and forth (and is adjustable). On the other hand, the push rod 26 is integrally fixed with a movable iron core 28 of the electromagnet portion 13, and the push rod 26 is inserted into a through hole 29 of the caliper main body 12a and loosely fits with the through hole 29.

The centripetal coupling 27 illustrated in FIG. 6 and FIG. 10 contains a spherical female portion (a saucer concave portion) 27b possessing a spherical concave portion and a spherical male portion (a saucer convex portion) 27a possessing a spherical convex portion held by the adjusting screw 25 (the push rod 26). It is possible to oscillate the brake shoe main body portion 22, and the pad portion 21 uniformly contacts the disk 11. The spherical male portion (a saucer convex portion) 27a and the spherical female portion (a saucer concave portion) 27b possess axial holes 56, 57 respectively.

A small diameter shaft portion 58 with a tapped hole protrudes integrally from the end of the push rod 26 (the end of the adjusting screw 25). The small diameter shaft portion 58 is inserted into the axial hole 56 of the spherical male portion 27a and further inserted into the axial hole 57 of the spherical female portion 27b, and a bolt 59 is fitted into the tapped hole of the small diameter shaft portion 58 so that the spherical female portion 27b pushes the spherical male portion 27a due to a spring member 55 comprising a coned disk spring.

In FIG. 6 and FIG. 10, the bolt 59 is pressed toward an end face of the small diameter shaft portion 58 through a plain washer, and retains the spring member 55 through the plain washer. Therefore, this spring member 55 is kept tightly close with the centripetal coupling 27 under a fixed pressure. Moreover, a plain face of the spherical male portion 27a constantly pushes a stepped face of a base end of the small diameter shaft portion 58 with stability.

The hollow 23 formed on the brake shoe 20 contains shallow holes of at least two steps diminishing in inner diameter by stages toward the inner part of the hole. The spherical female portion 27b is applied at the shallow hole portion of the largest diameter at the opening side, and a coned spring and a bolt head portion are applied at a second step and a third step. The centripetal coupling 27 and the spring member 55 are kept inside the hollow 23 of the brake shoe 20, and all the members are compactly kept inside the brake shoe 20.

Figure 11:
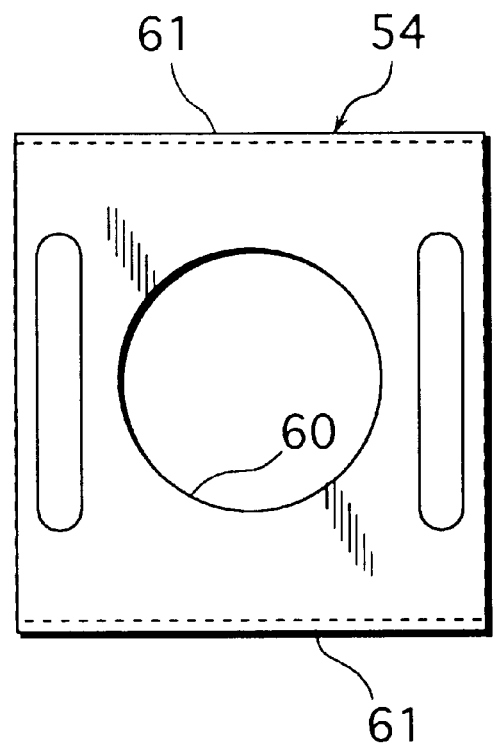
FIG. 11 is a front view of a spring retainer.
Figure 12:
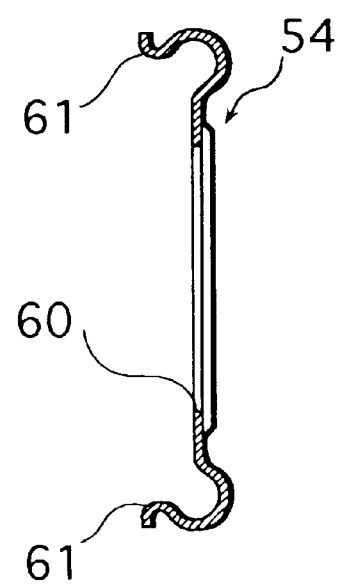
FIG. 12 is a sectional view of the spring retainer.

FIG. 11 and FIG. 12 show a spring retainer 54 comprising a thin plate. This spring retainer 54 possesses a through hole 60 in the center thereof and is approximately square as a whole, and its two parallel sides possess U-shaped (or Ω-shaped) hitching piece portions 61.

The through hole 60 of the spring retainer 54 is arranged to have a diameter smaller than each outer diameter of the adjusting screw 25, push rod 26, and spherical male portion 27a as shown in FIG. 6 and FIG. 10. In advance of assembling the brake shoe 20, the adjusting screw 25 and the push rod 26 are integrated with the spring retainer 54, centripetal coupling 27, coned disk spring (spring member 55), and bolt 59.

On the other hand, the main body portion 22 of the brake shoe 20 is provided with a protrusion formed by a wall surrounding the hollow 23, and a stepped portion of the hollow 23 is provided with the hitching grooves 24 formed as described above. When the brake shoe 20 is pushed, the hitching piece portions 61 of the spring retainer 54 are deformed elastically and are hitched at the grooves 24.

It is therefore possible to attach the brake shoe 20 easily and swiftly in a narrow space inside the caliper 12.

This retainer 54 has a function of keeping the spherical female portion 27b of the centripetal coupling 27 and the first stepped face of the hollow 23 tightly close each other, and the retainer 54 also has a function of restoring the brake shoe 20 to the original position when the brake is not applied (when the pad portion 21 does not contact the disk 11) as shown in FIG. 6 and FIG. 10.

Figure 7:
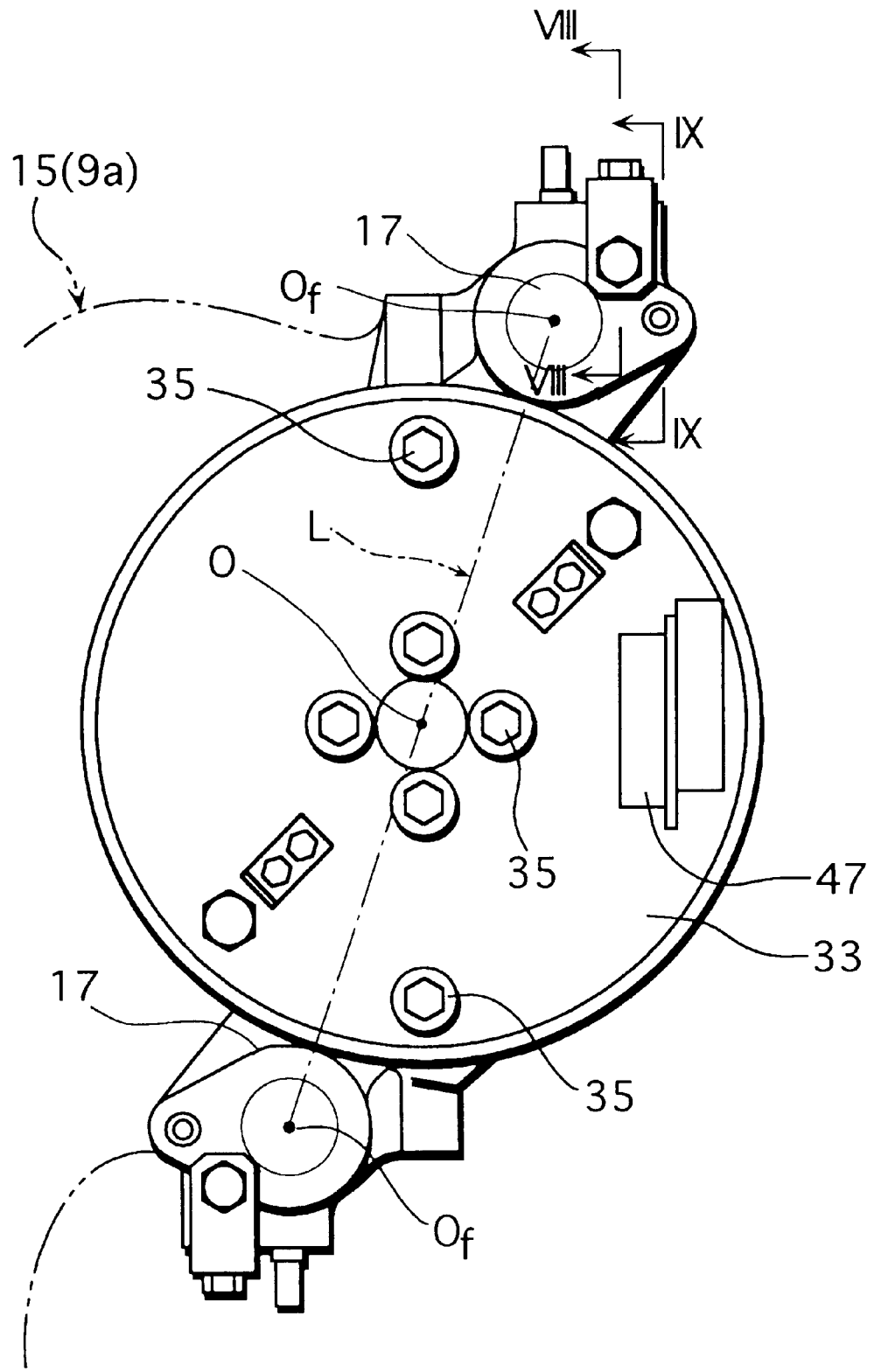
FIG. 7 is an enlarged right side view of a principal portion.

In FIG. 6, the electromagnet portion 13 has a fixed iron core 33 and the discoid movable iron core 28. An electromagnetic coil 34 is wound round the fixed iron core 33, and as shown in FIG. 6 and FIG. 7, the fixed iron core 33 and the coil 34 are connectively fixed on the caliper main body 12a through fitting bolts 35 and are relatively stable. Energizing the electromagnetic causes the movable iron core 28 and the integrally fixed push rod 26 to move so as to urge the brake pads 21 toward the disk 11 to provide a braking force.

A guide pin 37 is inserted in an axial hole 36 of the fixed iron core 33 and freely slides in an axial direction. The push rod 26 and the movable iron core 28 are integrally fixed with the guide pin 37.

Figure 4:
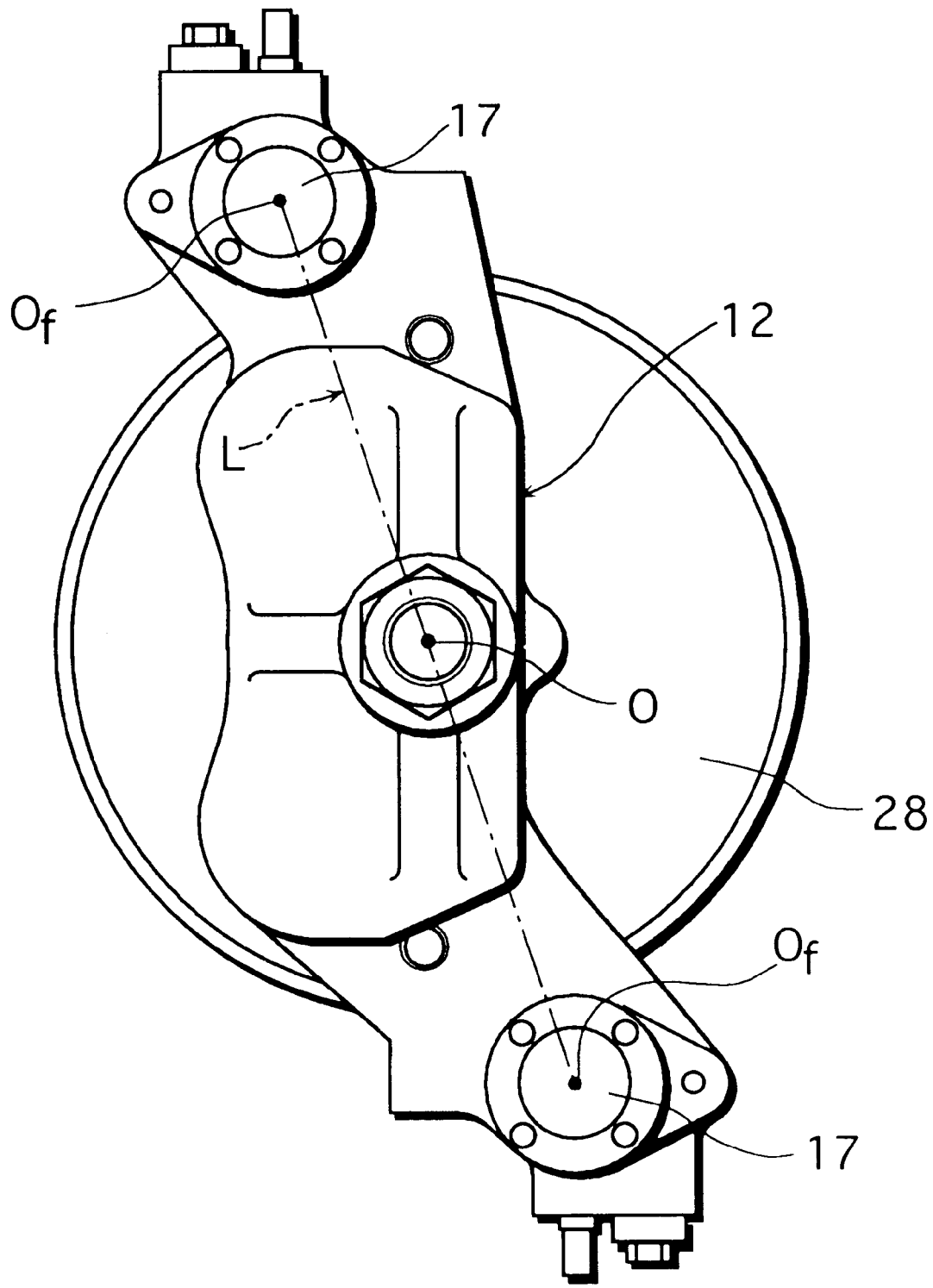
FIG. 4 is a left side view of a second brake for a hoist gear according to the present invention.

FIG. 4 and FIG. 7 show another embodiment. As well as in the foregoing embodiment, axis points $0_f$ of floating pins 17 are arranged in point symmetry of approximately 180° in respect of an axis point 0.

While the line passing the axis points $0_f$, 0, $0_f$ are vertical in the foregoing embodiment in FIG. 3, the line passing the axis points $0_f$, 0, $0_f$ are arranged to be inclined with a certain angle against a vertical line in this embodiment.

In FIG. 6, 38 shows a braking spring which is kept inside a fixed iron core 33 and pushes a movable iron core 28 toward an arrow E with elasticity. A brake force adjusting screw 39 is used to adjust brake force of pad portions 21 to press a disk 11. When an electromagnetic coil 34 is charged with electricity, the movable iron core 28 is attracted (moved toward an opposite direction of the arrow E), and the pad portions 21 are separated from the disk 11 to be in a braking-off situation.

In many cases, the electromagnet portion 13 is heavier than the aforementioned caliper 12. In these cases, it is difficult to position the caliper 12 in correspondence with the disk 11, and a unit 14 floatably supported by floating pins 17 inclines and moves toward the heavy electromagnet portion 13, and there is a risk of disturbing the pad portions 21 of the brake shoes 20 to contact the disk 11 uniformly. Therefore, as shown in FIG. 8 and FIG. 9, the brake for a hoist gear of this invention arranges a spring member 40 elastically pushing the caliper 12 toward a direction away from a fitting member 15 (i.e. a body 9*a*) and a regulation member 41 regulating the caliper 12 to move excessively toward the opposite direction so that the center of the caliper 12 corresponds to the disk 11.

Figure 9:
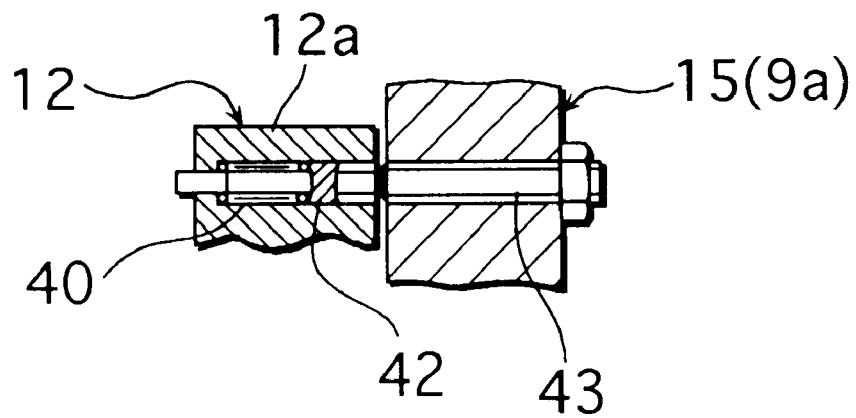
FIG. 9 is a section taken on line IX—IX in FIG. 7.

As shown in FIG. 9, a main body 12*a* of the caliper 12 is provided with a blind hole where a collared operation rod 42 is inserted and freely slides. The spring member 40 (for example, a compression spring) pushes the operation rod 42 toward the body 9*a* so that the operation rod 42 elastically moves away from the body 9*a* in order to prevent the whole unit 14 to move toward the electromagnet portion 13 due to the weight of the electromagnet portion 13. The elasticity of the spring member 40 is adjusted through an adjusting bolt 43 with a lock nut.

Figure 8:
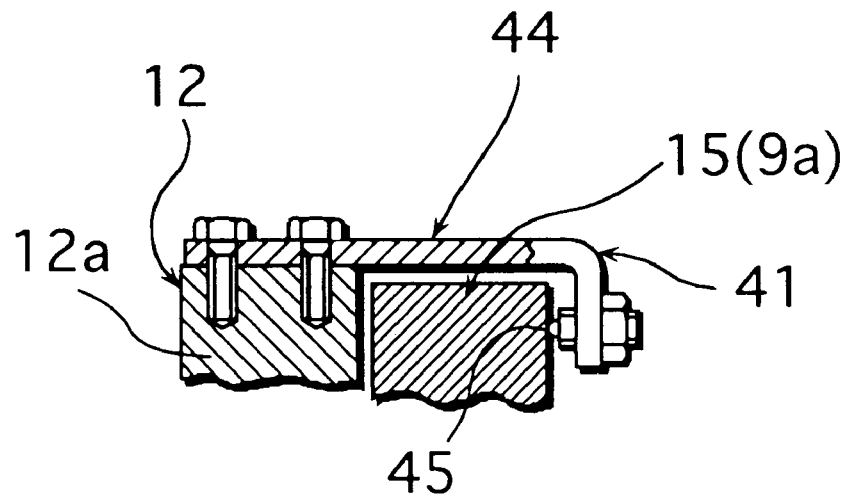
FIG. 8 is a section taken on line VIII—VIII in FIG. 7.

The regulation member 41 is composed as shown in FIG. 8. A belt-shaped plate 44 forming a L-shaped configuration is fixed on the caliper main body 12*a* through a bolt, and a contact member 45 is attached to the opposite side face of said belt-shaped plate 44 over the fitting member 15 (the body 9*a*). The belt-shaped plate 44 and the contact member 45 compose the regulation member 41. The contact member 45 comprises an adjusting screw with a lock nut, and enables minute adjustment in positioning the caliper 12.

Figure 13:
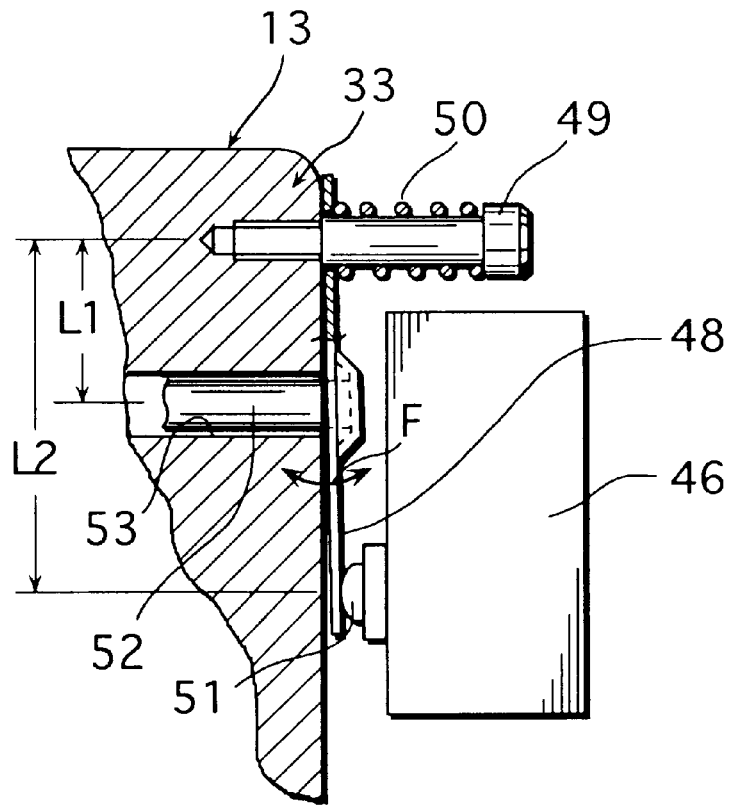
FIG. 13 is an enlarged partially sectional view of a principal portion.
Figure 14:
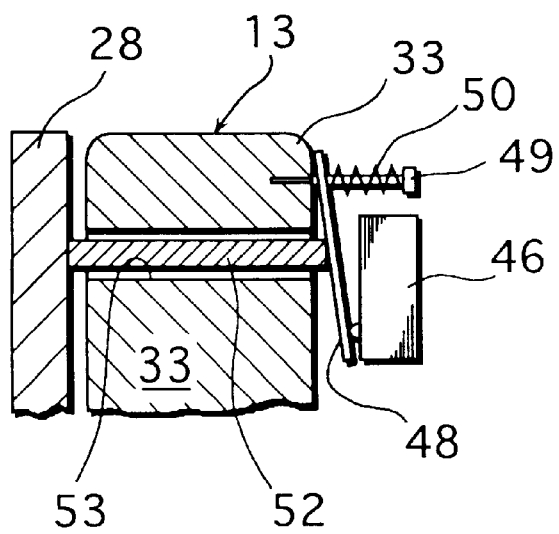
FIG. 14 is an explanatory view of a principal portion.

FIG. 13 and FIG. 14 show an enlarging mechanism for enlarging minute movement of the movable iron core 28 of the electromagnet portion 13. 46 is a limit switch for confirming that the brake is "opened", and is attached to an outer face of the fixed iron core 33 with a fitting piece 47 as shown in FIG. 5 and FIG. 7. 48 is a lever member in a configuration of a band-shaped plate. A base end of the lever member 48 is supported through a fitting bolt 49 and a compression spring 50 arranged on the outer face of the fixed iron core 33 and the lever member 48 freely oscillates as shown with an arrow F, and an end of the lever member 48 freely touches a detecting element 51 of the limit switch 46.

52 is a floating pin inserted in a through hole 53 of the fixed iron core 33 and freely oscillates in an axial direction. This pin 52 has a length longer than the thickness of the fixed iron core 33, and an inner end of the pin 52 contacts the movable iron core 28 and an outer end of the pin 52 contacts a middle portion of the lever member 48. When the movable iron core 28 is attracted toward the fixed iron core 33, the pin 52 moves to the right (in FIG. 14 and FIG. 13) oscillates outwardly against the compression spring 50, and the movement of the pin 52 is enlarged in order to move the detecting element 51. In FIG. 14, the movement of the pin 52 (the movable iron core 28) is enlarged by $L_2/L_1$ times and the detecting element 51 is moved enough so that the movement of the pin 52 is accurately detected by the limit switch 46.

In FIG. 2, it is possible to use the body of the bearing 8 on the input shaft portion 7*a* side as the fitting member 15 of the unit 14. It is also possible to arrange the left and right of the centripetal coupling 27 to be opposite.

Figure 15:
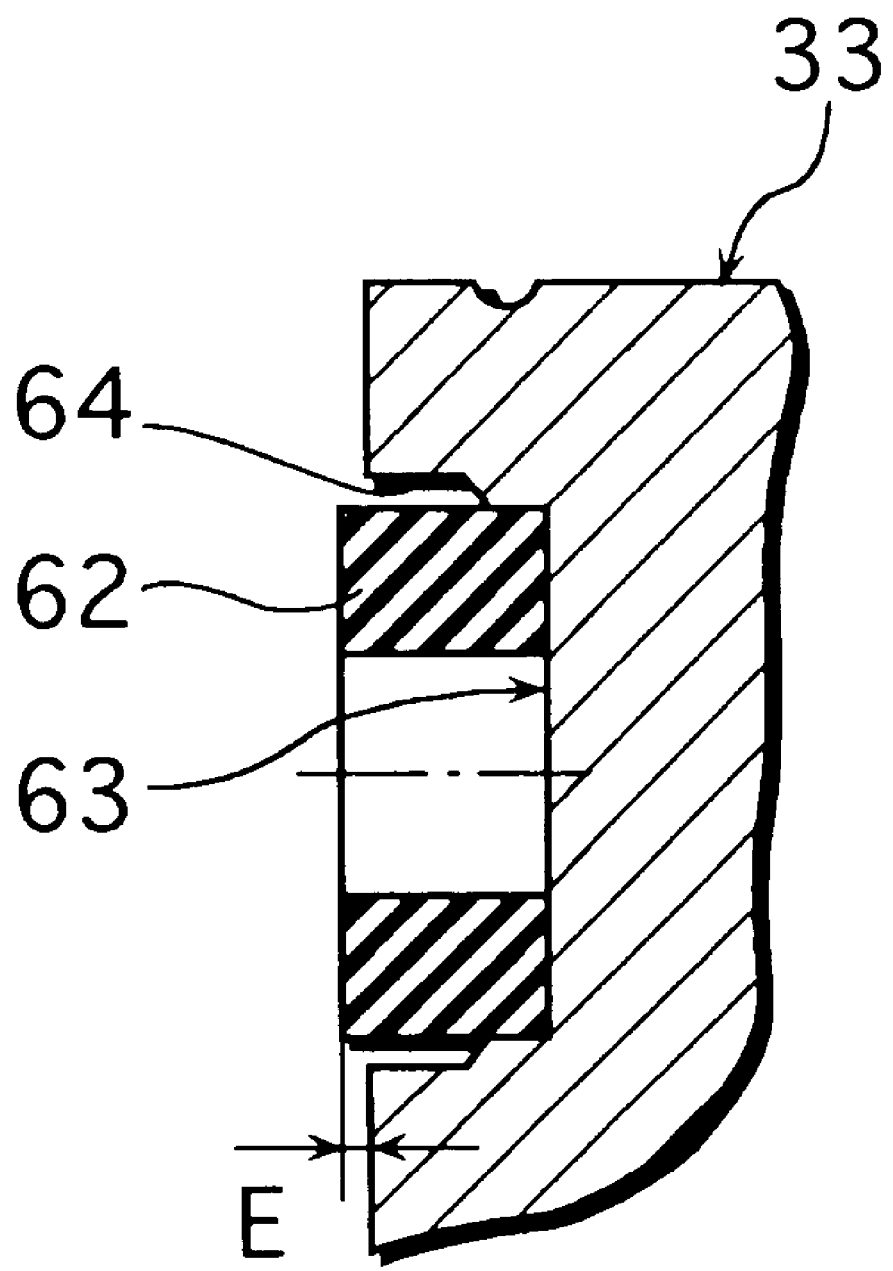
FIG. 15 is an enlarged section of a principal portion.

In FIG. 15 and FIG. 6, 62 is rubber arranged in hollows 63 formed on a face (of the movable iron core 28 side) of the fixed iron core 33, and the rubber 62 is contained in the hollow 63 and absorbs shock caused by braking. FIG. 15 clearly shows that the rubber 62 slightly protrudes for a minute dimension E when the movable iron core (not illustrated) is absent (in a free situation), and a part of the rubber 62 escapes sideways toward an escape space portion 64 when the movable iron core contacts and presses the rubber 62.

Figure 16:
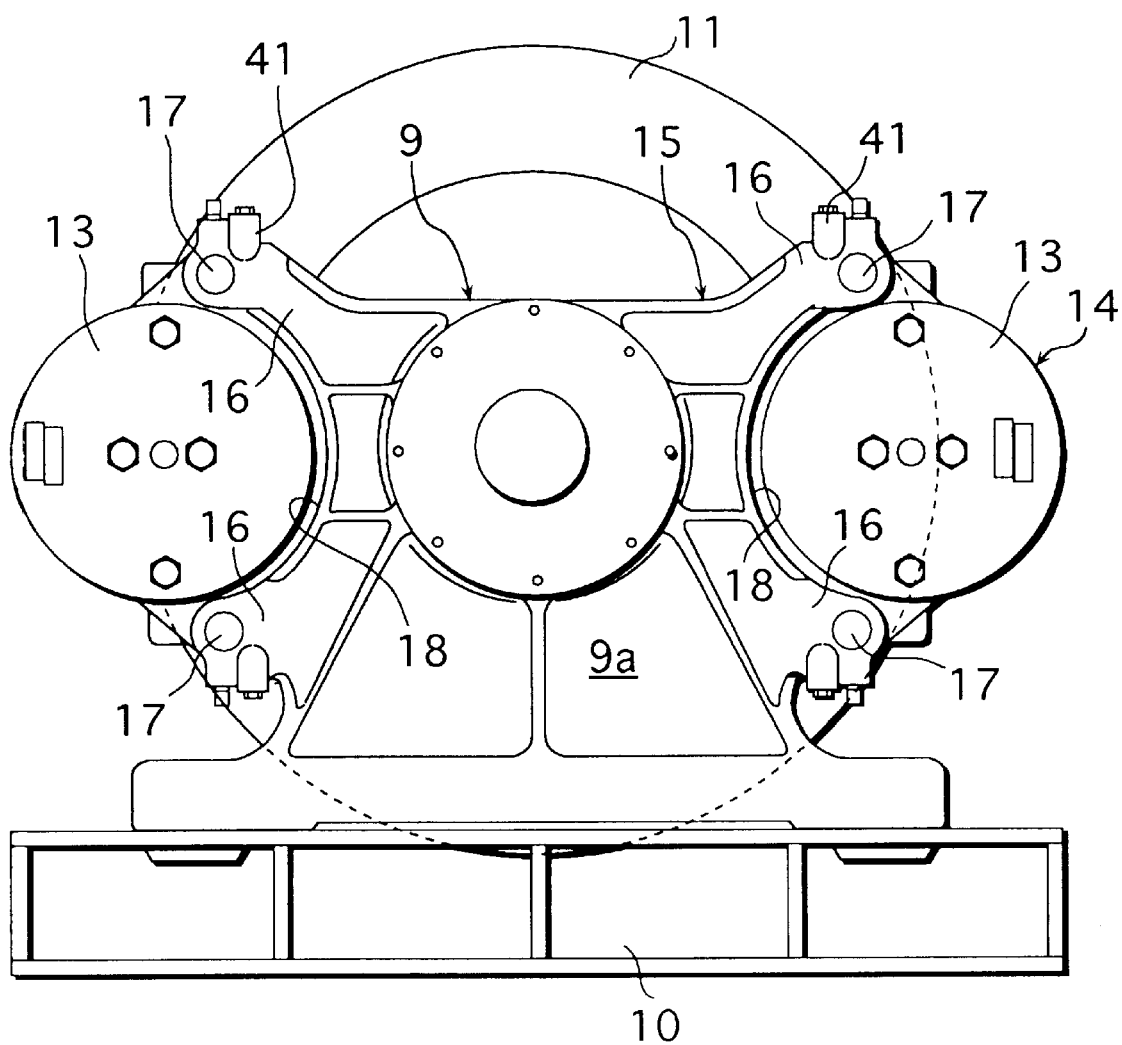
FIG. 16 is a right side view of a third brake for a hoist gear according to present invention.
Figure 18:
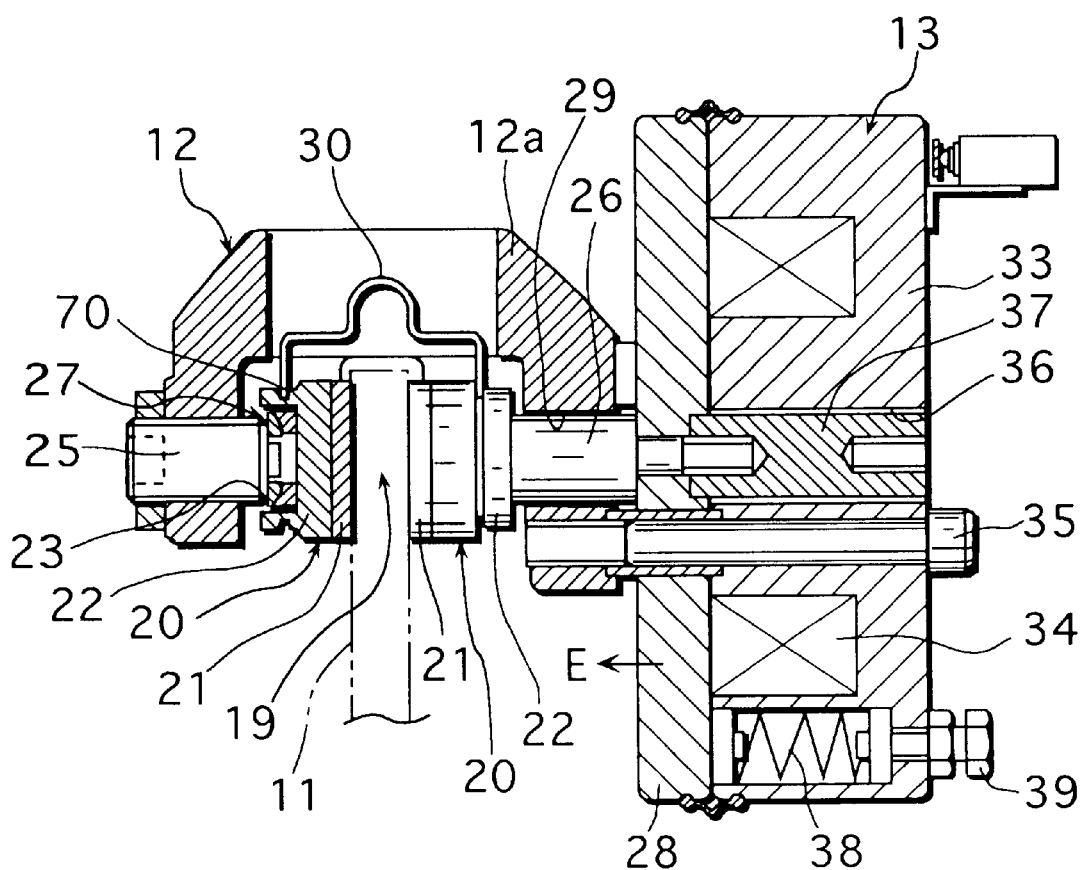
FIG. 18 is an enlarged section of a principal portion.
Figure 19:
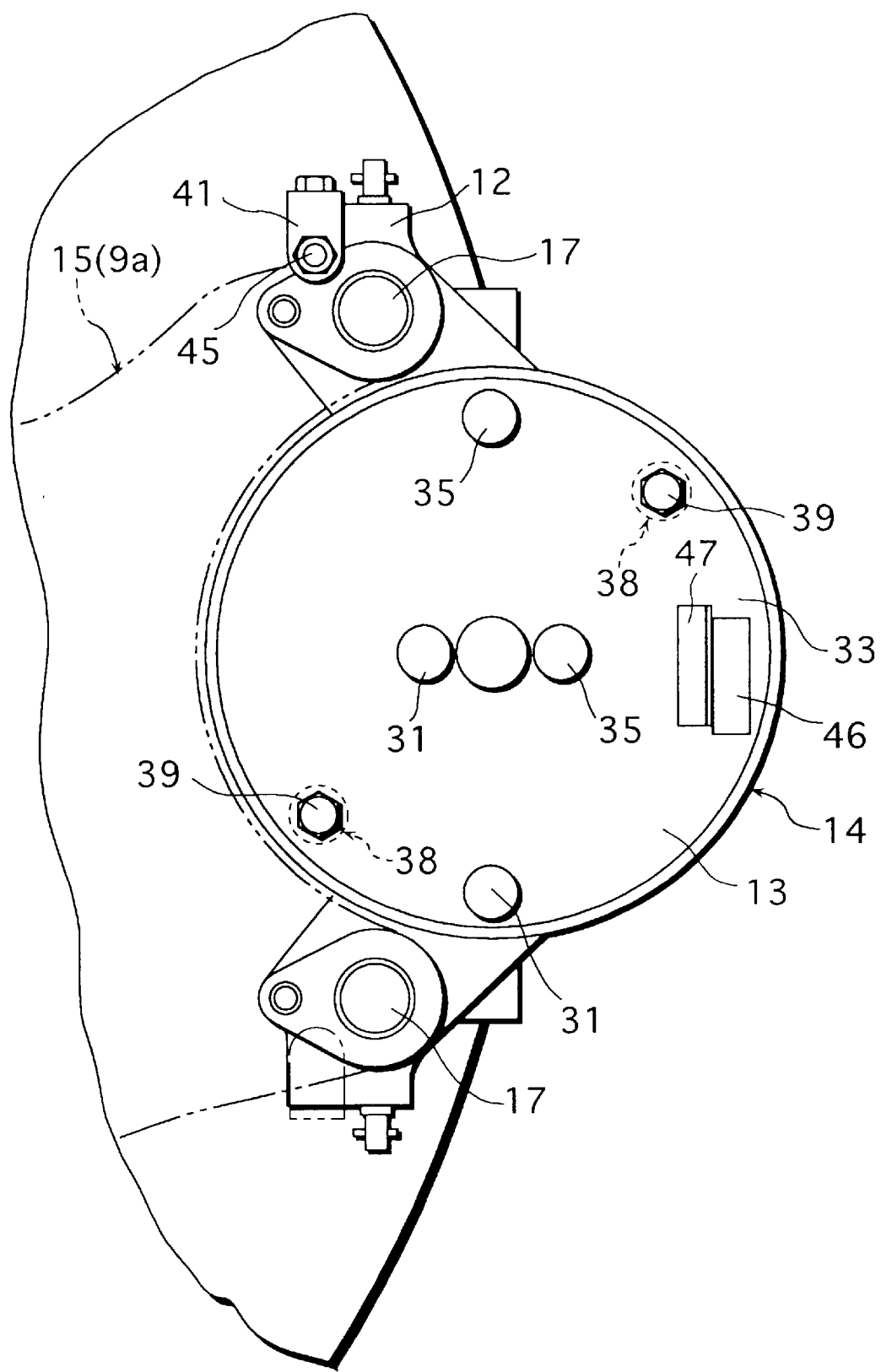
FIG. 19 is an enlarged right side view of a principal portion.
Figure 20:
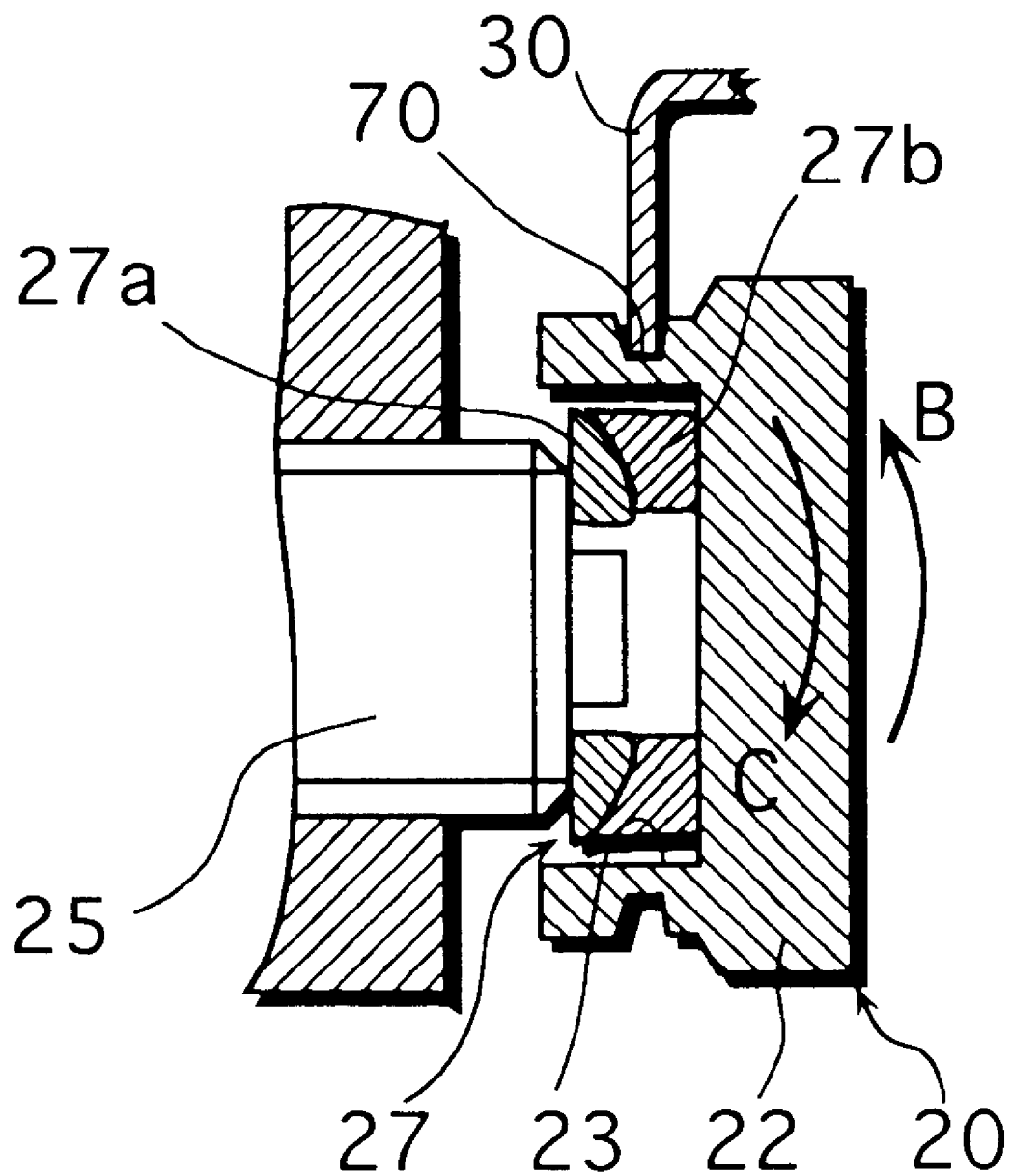
FIG. 20 is an enlarged section of a principal portion.

FIG. 16 and FIG. 19 show still another embodiment, wherein a main body portion 22 of a brake shoe 20 possesses a hollow 23 on an outer end face thereof and a depressed circumferential groove 70 on an outer circumferential face thereof. A centripetal coupling 27 of this embodiment comprises, as shown in FIG. 20, a saucer concave portion 27*b* having a spherical concave and a saucer convex portion 27*a* having a spherical convex with a hole where an adjusting screw 25 supports the saucer convex portion 27*a*. The brake shoe main body portion 22 freely oscillates as shown with arrows B and C, and a pad portion 21 uniformly contacts a disk 11 (see FIG. 18). In the similar (symmetric) manner with the construction of FIG. 20, a brake shoe main body portion 22 is attached to an end of a push rod 26 through a centripetal coupling 27.

Figure 21:
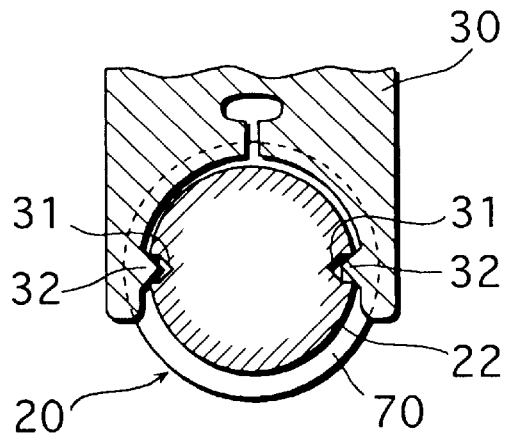
FIG. 21 is an enlarged view of a principal portion.

As shown in FIG. 18, FIG. 20, and FIG. 21, both ends of an upside-down U-shaped or arch-shaped return spring 30 are hitched in a depressed circumferential groove 70. This return spring 30 continuously pushes the pair of brake shoes 20 with elasticity toward the opposite directions.

Figure 17:
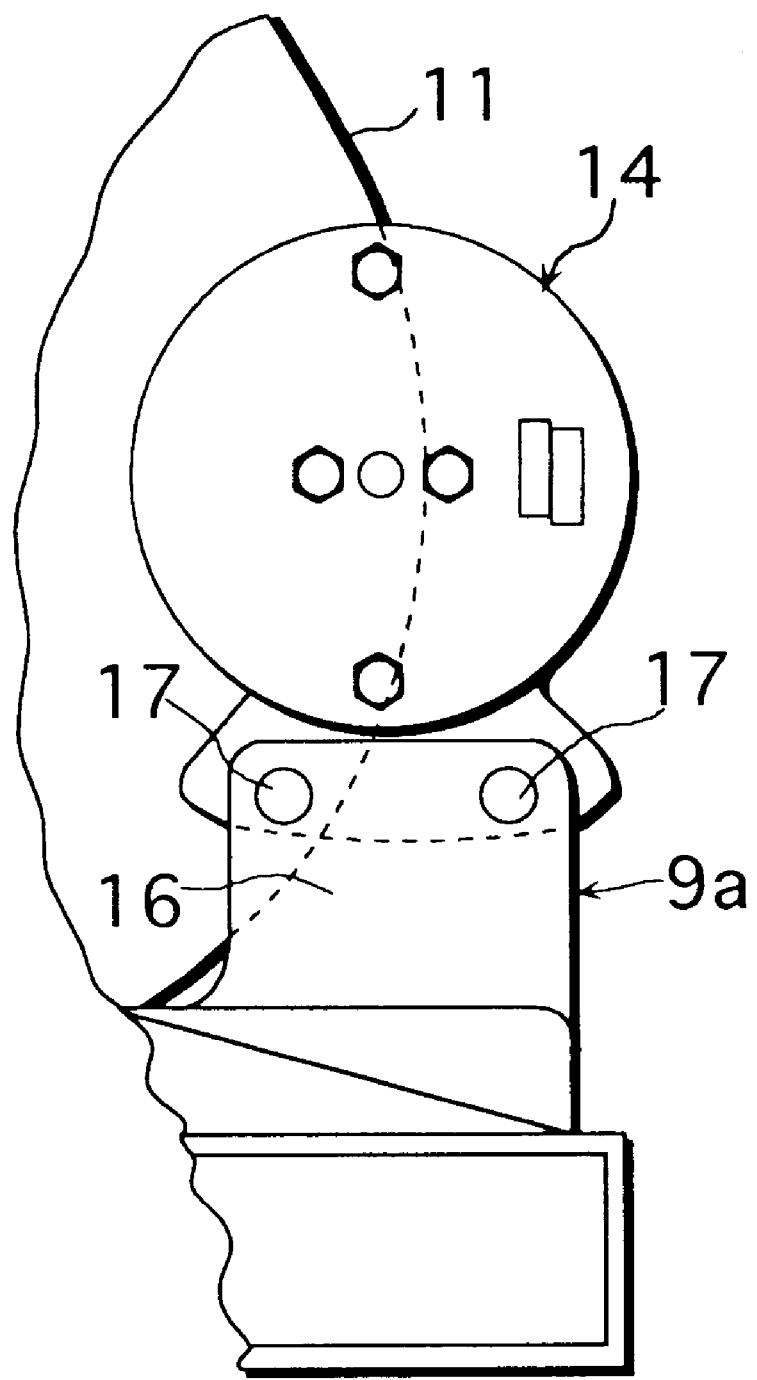
FIG. 17 is a right side view of a fourth brake for a hoist gear according to the present invention.

That is to say, one of the pair of brake shoes 20 is attached to the end of the push rod 26 through a centripetal coupling 27, and the other is attached to the end of the adjusting screw 25 through a centripetal coupling 27. The return spring 30 continuously pushes the pair of brake shoes 20 with elasticity toward the opposite directions, and makes the pair of brake shoes 20 to be tightly held at the end of the push rod 26 and the end of the adjusting screw 25 through the centripetal couplings 27. As shown in FIG. 17, it is preferable to arrange a fitting piece portion 16 formed on a body 9*a* to be wide in width and provided with two pins 17 in some cases.

In an embodiment shown in FIG. 21, a depressed circumferential groove 70 of a brake shoe main body portion 22 is provided with small hitching holes 31 in symmetry of 180°, and a return spring 30 is provided with a depression which is fitted with the depressed circumferential groove 70 and is provided with small hitching convex portions 32 on an inner margin thereof in order to prevent the return spring 30 to disturb the aforementioned oscillation of the brake shoe main body portion 22.

Figure 22:
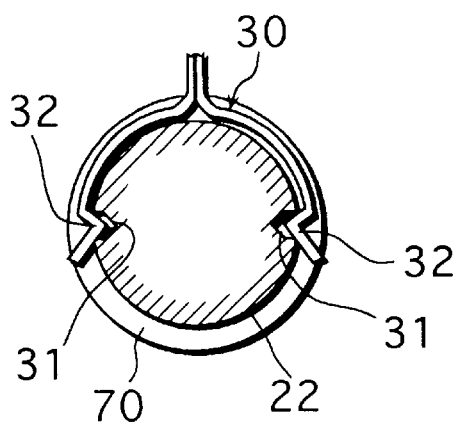
FIG. 22 is an enlarged view of a principal portion showing a modification.
Figure 23:
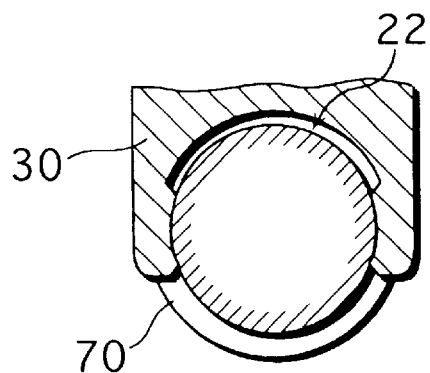
FIG. 23 is an enlarged section of a principal portion of still another embodiment.

FIG. 22 illustrates a modification and shows that it is possible to form a return spring 30 by bending and curving a wire rod. FIG. 23 shows another modification, wherein the small hitching holes 31 in FIG. 21 and FIG. 22 are omitted and an inner margin of a depression of a return spring 30 is directly hitched in a depressed circumferential groove 70.

Therefore, according to the present invention, it is possible to reduce number of the parts, simplify the construction, and reduce the weight of the apparatus. Moreover, the present invention is advantageous in strength, and external force (moment) on a part of the body 9*a* supporting the floating pin 17 is relatively small.

The brake shoes 20 uniformly and accurately contact the disk 11, which enables accurate and stable braking without noises. Especially a typical brake for a hoist gear keeps a stationary disk 11 in a braking situation, and contacts and slides on the rotating disk 11 only for a short time, therefore unequal contact is not automatically adjusted. In the present invention, the pad portion is arranged to accurately contact the disk 11 from the beginning of use.

Moreover, it is possible to prevent the pad portion to unnecessarily contact and slide on the rotating winding drum 2 (the disk 11) and gets abnormal abrasion. Especially, although the brake shoes 20 are arranged to freely oscillate, it is possible to prevent the brake shoes 20 to unnecessarily contact and slide on the disk 11.

Furthermore, owing to the centripetal couplings 27, the brake shoes 20 oscillate freely and contact the disk 11 uniformly, and it is possible to apply accurate and stable braking. It is also possible to arrange the brake shoes 20 at the end of the push rod 26 and the end of the adjusting screw 25 through compact and simple centripetal couplings 27 and prevent the brake shoes 20 to come off. The brake is easily assembled, and reliability in centripetal degree increases.

The spring member 40 reduces weight unbalance between the caliper 12 and the electromagnet portion 13, and the caliper 12 is accurately positioned so that the disk 11 centers the caliper 12 and the pad portion uniformly contacts the disk 11.

The apparatus as a whole is compact and the number of the parts diminishes.

In a general brake, movement (stroke) of a movable iron core 28 of an electromagnet portion 13 is minute and is not easily detected by a limit switch. According to the present invention, the movement is accurately detected and only a simple construction is required for detection.

The caliper 12 is smoothly moved and the pad portion 21 and the contact face of the disk 11 are always kept parallel without inclination. Moreover, shock on braking is absorbed.

While preferred embodiments of the present invention have been described in this specification, it is to be understood that the invention is illustrative and not restrictive, because various changes are possible within the spirit and indispensable features.

What is claimed is:

1. A hoist gear with a brake comprising:

a pair of floating pin fitting piece portions integrally protruding from a body of a bearing supporting a winding drum; and a caliper attached to said fitting piece portions of the body through floating pins.

2. A hoist gear with a brake comprising:

a pair of floating pin fitting piece portions integrally protruding from a body of a bearing supporting a winding drum; and a caliper attached to said fitting piece portions of the body through floating pins which axis points are positioned in point symmetry of approximately 180° with respect to an axis point of a push rod inserted in the caliper.

3. The hoist gear as set forth in claims 1 or 3, wherein the electromagnet portion possesses the movable iron core and a fixed iron core, and rubber for absorbing shock upon braking is applied between corresponding faces to the movable iron core and the fixed iron core.

* * * * *